US009923904B1

(12) United States Patent
Saylor et al.

(10) Patent No.: US 9,923,904 B1
(45) Date of Patent: *Mar. 20, 2018

(54) SHARING DOCUMENT INFORMATION

(71) Applicant: MicroStrategy Incorporated, Vienna, VA (US)

(72) Inventors: Michael J. Saylor, Vienna, VA (US); Hector Vazquez, Ashburn, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,005

(22) Filed: Dec. 30, 2016

Related U.S. Application Data

(63) Continuation of application No. 14/599,146, filed on Jan. 16, 2015, now Pat. No. 9,565,175.

(60) Provisional application No. 61/928,068, filed on Jan. 16, 2014.

(51) Int. Cl.
*H04L 29/06* (2006.01)
*H04L 29/08* (2006.01)
*H04L 12/58* (2006.01)
*H04W 4/12* (2009.01)
*H04W 88/16* (2009.01)

(52) U.S. Cl.
CPC ............ *H04L 63/108* (2013.01); *H04L 51/04* (2013.01); *H04L 63/062* (2013.01); *H04L 63/08* (2013.01); *H04L 67/06* (2013.01); *H04L 67/34* (2013.01); *H04W 4/12* (2013.01); *H04W 88/16* (2013.01)

(58) Field of Classification Search
CPC .......................... G06F 21/10; G06F 17/30165
See application file for complete search history.

(56) References Cited

U.S. PATENT DOCUMENTS

| 8,875,309 B1 | 10/2014 | Diamond |
|---|---|---|
| 2004/0030930 A1 | 2/2004 | Nomura |
| 2008/0200154 A1 | 8/2008 | Maharajh |
| 2010/0146051 A1 | 6/2010 | Agrawal |

(Continued)

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

(Continued)

*Primary Examiner* — Jason K Gee
(74) *Attorney, Agent, or Firm* — Fish & Richardson P.C.

(57) ABSTRACT

The disclosure of the present document can be embodied in a non-transitory computer-readable medium storing instructions that cause one or more processors to perform various operations, including, receiving, from a first client device associated with a user account of a first user, a request for sharing a document. The document is associated with a credential of the first user, and the credential is associated with the user account of the first user. The operations include transmitting, in response to the request, a code associated with the document, and receiving, from a second client device, a request to access the document. The request to access the document includes the code associated with the document. The operations include determining, based on the request to access the document, that the second client device is authorized to access the document, and communicating, to the second client device, a message including information about the document.

20 Claims, 9 Drawing Sheets

(56) References Cited

U.S. PATENT DOCUMENTS

2010/0299522 A1    11/2010    Khambete
2016/0044122 A1    2/2016    Sandholm

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

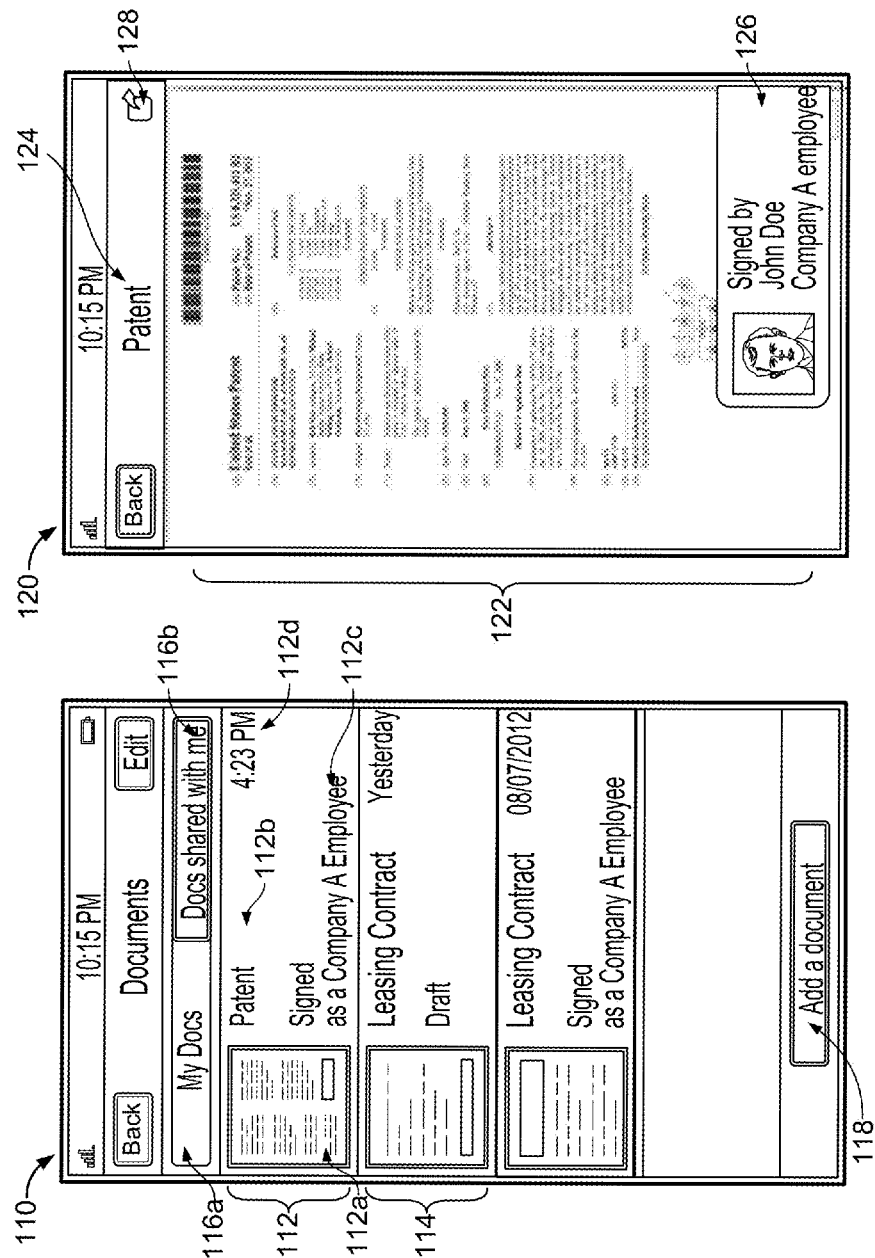

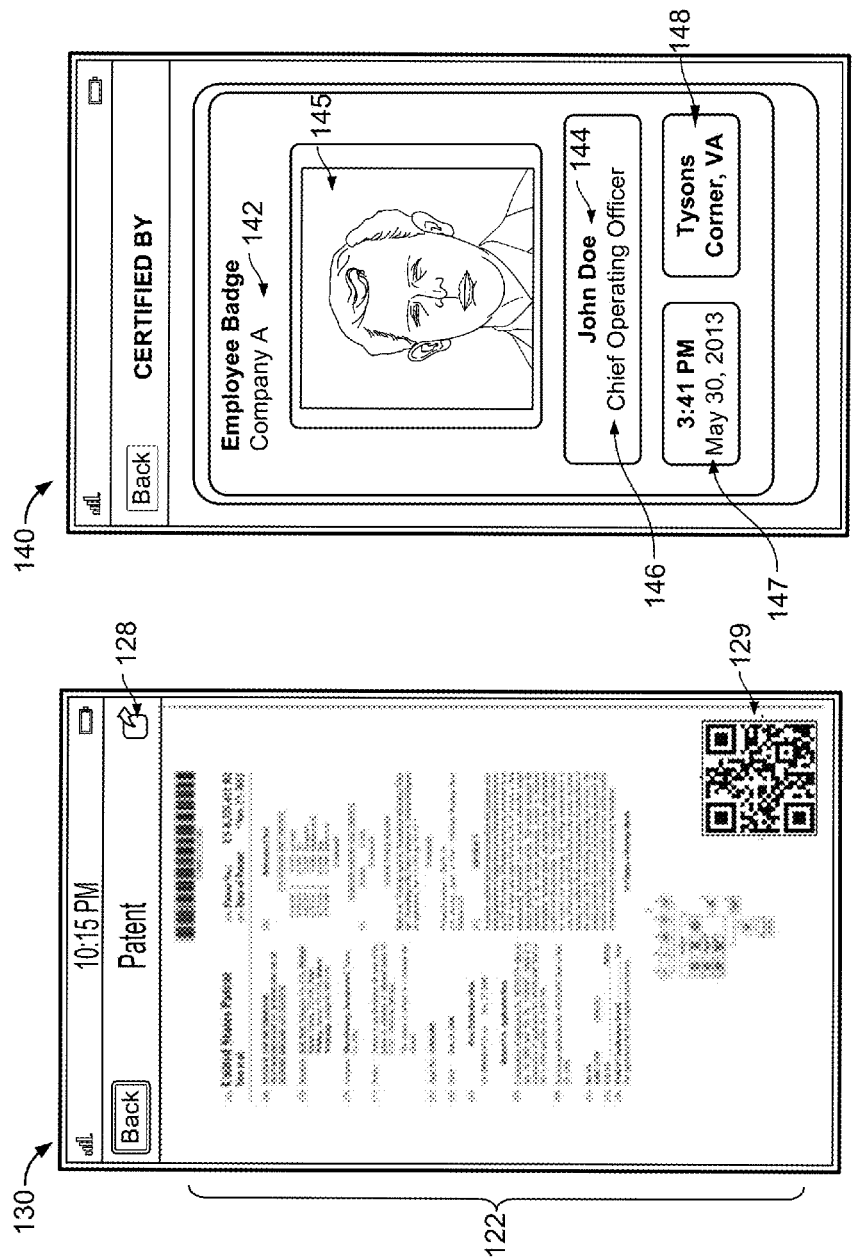

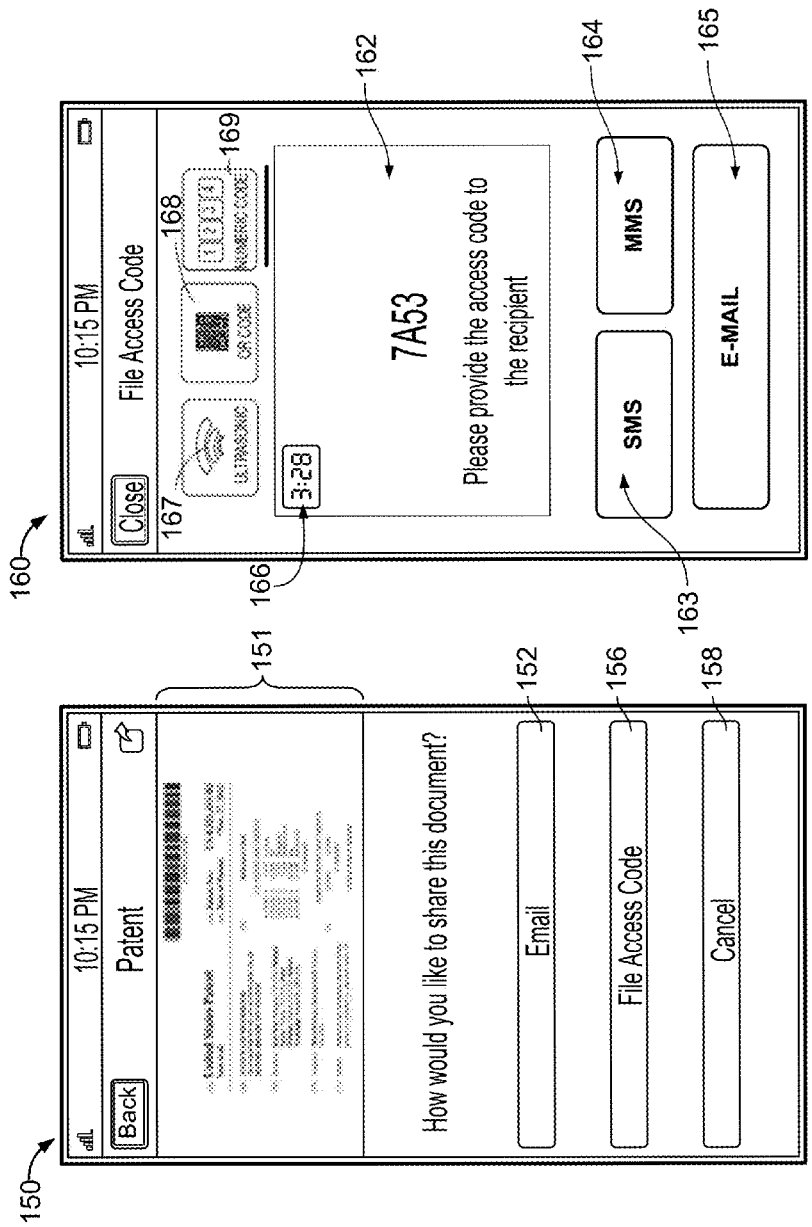

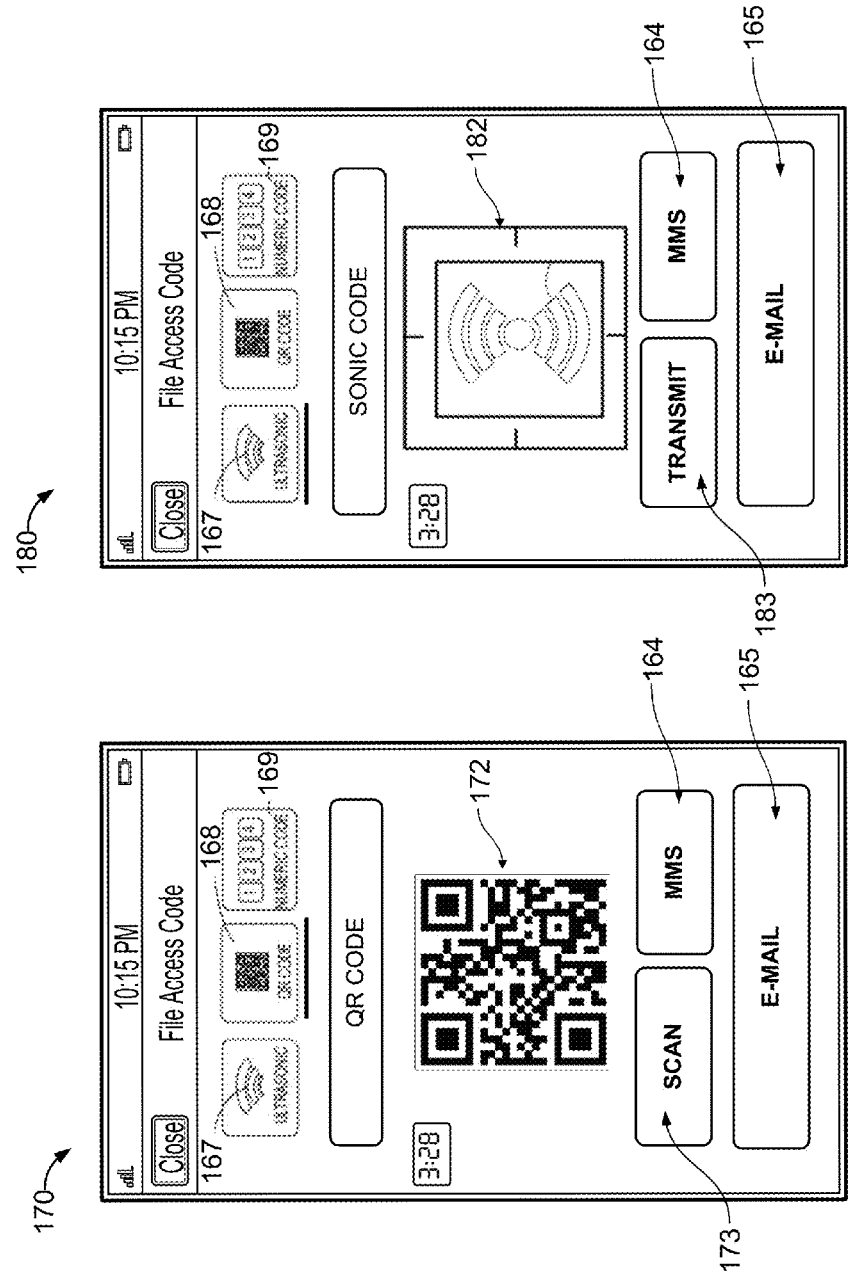

SHARING DOCUMENT INFORMATION

CROSS REFERENCE TO RELATED APPLICATION

This application is a continuation (and claims the benefit of priority under 35 USC 120) of U.S. application Ser. No. 14/599,146, filed Jan. 16, 2015, now allowed, which claims the benefit of U.S. Provisional Application Ser. No. 61/928,068, filed on Jan. 16, 2014. Both of these prior applications are incorporated by reference in their entirety.

TECHNICAL FIELD

This disclosure generally relates to sharing document information.

BACKGROUND

A server may be used to store files (e.g., electronic documents) that are associated with user accounts.

SUMMARY

In one aspect, the disclosure features a non-transitory computer-readable medium storing instructions executable by one or more processors which, upon such execution, cause the one or more processors to perform various operations. The operations include receiving, from a first client device associated with a user account of a first user, a request for sharing a document. The document is associated with a credential of the first user, and the credential is associated with the user account of the first user. The operations also include transmitting, in response to the request, a code associated with the document to the first client device, and receiving, from a second client device, a request to access the document, the request to access the document including the code associated with the document. The operations further include determining, based on the request to access the document, that the second client device is authorized to access the document, and communicating, to the second client device, a message including information about the document.

In another aspect, the disclosure features a non-transitory computer-readable medium storing instructions executable by one or more processors which, upon such execution, cause the one or more processors to perform various operations including receiving, from a first client device associated with a user account of a first user, a request for sharing a document. The document is associated with a credential of the first user, and the credential is associated with the user account of the first user. The operations also include transmitting, in response to the request, an alphanumeric code associated with the document to the first client device, and receiving, from a second client device, a request to access the document, the request to access the document including the alphanumeric code associated with the document. The operations also include determining, based on the request to access the document, that the second client device is authorized to access the document, and that the request to access the document was transmitted from the second client device as a short messaging service (SMS) message. The operations further include communicating, to the second client device, an SMS message including text-based information about the document based on determining that the request to access the document was transmitted from the second client device as an SMS message.

In another aspect, the disclosure features a non-transitory computer-readable medium storing instructions executable by one or more processors which, upon such execution, cause the one or more processors to perform various operations including receiving, from a first client device associated with a user account of a first user, a request for sharing a document. The document is associated with a credential of the first user, and the credential is associated with the user account of the first user. The operations also include transmitting, in response to the request, a Quick Response (QR) code associated with the document to the first client device, and receiving, from a second client device, a request to access the document, the request to access the document being based on the QR code associated with the document. The operations also include determining, based on the request to access the document, that the second client device is authorized to access the document, and that the request to access the document was transmitted from the second client device as a multimedia messaging service (MMS) message. The operations further include communicating, to the second client device, an MMS message including text-based information about the document based on determining that the request to access the document was transmitted from the second client device as an MMS message.

Implementations can include one or more of the following features. The document can include a certification. The certification can be based on metadata associated with the document. The certification can include a digital signature of the first user. The code can be transmitted to the first client device or the second client device. The code can be transmitted using a short messaging service (SMS) protocol or a multimedia messaging service (MMS) protocol, or e-mail. The request for sharing the document can include an identification of the second client device. The request to access the document can include a portion of the document; and the operations can further include obtaining the document from a storage device, and determining that the portion of the document from the request to access the document matches a corresponding portion of the document obtained from the storage device. The determination can be done prior to communicating, to the second client device, the message including information about the document. The code associated with the document can include one or more of a Quick Response (QR) code, a sound-wave based code, a numeric code, an alphanumeric code, and a uniform resource locator (URL). The request to access the document can be received from the second client device via a short messaging service (SMS) gateway or a multimedia messaging service (MMS) gateway. The message can include one or more of metadata information associated with the document, a uniform resource locator (URL) for accessing the document, and an image of the document. The message can be communicated via a short messaging service (SMS) gateway or a multimedia messaging service (MMS) gateway. The request to access the document can include an identification of the second client device. Communicating the message can further include verifying that the second client device is associated with a user account of a second user, and verifying that the user account of the second user is authorized to access the document.

Implementations of the above techniques include a method, a computer program product and a system. The computer program product is suitably embodied in a non-transitory computer-readable medium and includes instructions executable by one or more processors. The instructions are configured to cause the one or more processors to perform the above described actions.

The system includes one or more processors and instructions embedded in a non-transitory computer-readable medium that are executable by the one or more processors. The instructions, when executed, are configured to cause the one or more processors to perform the above described actions.

The details of one or more aspects of the subject matter described in this specification are set forth in the accompanying drawings and the description, below. Other potential features will be apparent from the description and drawings, and from the claims.

BRIEF DESCRIPTION OF THE DRAWINGS

FIGS. 1A-1H illustrate examples of user interfaces for sharing a document.

DETAILED DESCRIPTION

Figure 2C:
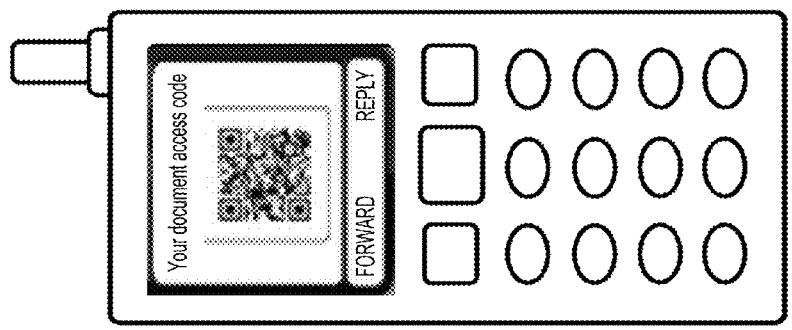
FIGS. 2A-2C illustrate examples of user interfaces displayed on a client device for requesting access to a document that is shared with a user of the client device.

An identity management application may allow a credentialed user to store and retrieve electronic files on a server. The identity management application also may provide a credentialed user with file access codes that are associated with stored electronic files. Such a file access code can be transferred to other users, e.g., via Short Message Service (SMS), Multimedia Messaging Service (MMS), or Bluetooth, with whom the credentialed user wishes to share a corresponding electronic file. Even where the recipient only has a feature phone, the recipient may be able to access the electronic file, or information about the electronic file, by transmitting the file access code to a gateway that, responsive to receiving the code, may return various details about the electronic file (e.g., title, author/signatory, signature date, and/or a link to the file) and/or the electronic file itself.

In this context, an electronic file may be any software file that includes data and can be stored in electronic form in tangible storage media, such as computer memory or hard drives. For example, the electronic file may be a textual document, a graphical document, an audio file, a video file or a multimedia file, among other file types. Electronic files may be managed by a server or collection of servers. The electronic files may also be stored on the client devices or on a server with which the client devices can communicate. The server may include user accounts for the users of the client devices and associate the electronic files with user accounts corresponding to the owners of the electronic files. In some implementations, a trusted repository of documents (and/or other files) can be established by stamping documents with metadata. The metadata can include, for example, timestamps, identifications of persons who have signed the documents, and access history. In some implementations, users may communicate with the server using instances of an identity management application that runs on their respective client devices. The identity management application can be used to, for example, view, sign, or otherwise edit documents, share documents with other users, and view documents shared by other users.

In some implementations, a document (or information about a document) that has been shared by another user may be accessed and/or viewed using a messaging based system such as a short messaging service (SMS) or a multimedia messaging service (MMS) using, for example, a code associated with the document. In some implementations, such a code received over the messaging system can be forwarded by a recipient to a gateway (e.g., via an SMS message if the code is an alphanumeric code or via an MMS message if the code is a QR code). The gateway can be configured to interface with a server to interpret the received code, identify the document corresponding to the received code, and then make information (e.g., metadata) about the document available to the recipient.

For example, if the recipient's client device is a feature phone that is incapable of executing an instance of the identity management application, the recipient can forward the code via an SMS message to the gateway. The gateway may in turn send an SMS message with information about the document (e.g., title, author, identification of the person signing the document, signature date, and/or a uniform resource locator (URL) for accessing the document over a browser) to the recipient's feature phone. In the event that the SMS message includes an URL, the recipient may be able to access the document (or an image of the document) by selecting the link, causing a mobile browser on the recipient's feature phone to be launched to access the document. In some implementations, in response to receiving the code from the recipient's feature phone, the gateway may send an MMS message with an image of the document to the recipient's feature phone. In some implementations, the messaging based document access can also be facilitated on a client device (e.g., a smartphone) that is capable of executing an instance of the identity management application described above.

To share an electronic file such as a document, a user may obtain a file access code for the file from the server, for example, via the identity management application running on his/her client device, and share the file access code with a recipient. The electronic file may be stored at the server or uploaded by the user. Subsequently, the recipient can validate the recipient's authorization to access the electronic file to the server by entering the file access code into the identity management application running on the recipient's client device. Once the recipient's authorization to access the electronic file is validated, the server may allow the recipient to access the electronic file.

Systems that generate, distribute, and validate file access codes for access to electronic files are described herein. For the purposes of this discussion, the terms user and client device associated with the user are used interchangeably. The terms server and server application are used synonymously, as are the terms identity management application, software application and client device.

FIGS. 1A-1F illustrate examples of user interfaces 110, 120, 130, 140, 150 and 160 for sharing an electronic file such as a document. The user interfaces 110, 120, 130, 140, 150, and 160 can be presented by the software application executed on a user's client device. The user interfaces described above can allow the user to communicate with a server to generate a file access code (also referred to herein as a 'code') associated with the electronic file. The user may be the owner of the electronic file, or have the authorization to share the electronic file with other users, or both. The software application may be implemented as a set of instructions that are stored in some tangible non-transitory computer readable medium, such as a magnetic hard drive, read-only memory (ROM) or random access memory (RAM) that is included in, or coupled to, the client device. The set of instructions may be executed by a processor associated with the client device for generating the user interfaces 110, 120, 130, 140, 150, 160 and 170 and enabling communication with the server.

In some implementations, the sender client device may be a mobile device, such as a smartphone, an electronic tablet computer, or a portable music player. In such implementations, the software application may be a mobile application, and the user interfaces 110, 120, 130, 140, 150, 160 and 170 can be formatted for presentation on the display of the mobile device. In other implementations, the sender client device may be a desktop or laptop computer. In such implementations, the user interfaces 110, 120, 130, 140, 150, 160 and 170 can be formatted for presentation on the display of the desktop or laptop computer.

FIG. 1A illustrates a user interface 110 of the software application that shows a list of electronic files, such as a patent document 112 and leasing contract 114, which are available to the user of the client device within the application. The user interface 110 is presented on a display of a client device. In the example shown, the electronic files are documents, such as, for example, Microsoft Word or Adobe PDF files. The documents may be stored locally on the client device. For example, the documents may be saved in the tangible storage medium associated with the client device. Alternatively, the documents may be stored on the server and accessible to the client device from the server over a network connection.

Some of the electronic files may be owned by the user of the client device, while some other electronic files may be owned by other entities but shared with the user of the client device. Based on the selection of the buttons 116a or 116b, the user interface 110 can switch between views that show the list of documents owned by the user of the client device and the list of documents shared with the user, respectively. In some implementations, the user interface 110 can show both lists in a single view. In the example shown, the button 116a is selected, such that the user interface 110 shows the list of documents owned by the user of the client device.

For either list discussed above, each item in the list may include a small graphical representation (for example, a "thumbnail") of the electronic file and an identifier for the electronic file, such as a filename. In addition, each item may include information indicative of whether the electronic file has been electronically signed (for example, information indicative of whether the electronic file has been authenticated using a digital signature). For example, the owner of the file may have signed the electronic file using a private key belonging to the owner. In some implementations, the file owner may have several different identities and a different private key for each identity. In such cases, the file owner may authenticate different files using different digital signatures. The digital signatures may be based on public key infrastructure (PKI), for example, the Digital Signature Algorithm (DSA). In some implementations, a document can be signed without applying digital signature techniques. For example, a document can be marked as being signed upon receiving an indication (for example, via an application executing on a user's client device) that the user intends to sign the document.

Each item also may include a timestamp. The timestamp can indicate the time when the electronic file was created, the time when the electronic file was included in the displayed list of electronic files (for example, the file may have been added to the list using the button 118), or the time the electronic file was last accessed or modified. For example, the file 112 includes a thumbnail 112a, a filename 112b, an indication 112c that it was signed with an identity "Company A Employee," and a timestamp 112d.

Although the user interface 110 shows the electronic files displayed as a list, other arrangements of the electronic files are also possible. For example, in some implementations, the user interface 110 may present the electronic files in a grid view, with each file being represented by a thumbnail and, optionally, by the filename.

The user of the client device may wish to share one of the files, for example, the patent document 112, with another user. In this case, the user of the client device can be referred to as a sender of the electronic file. The user receiving the electronic file can be referred to as a recipient.

In some implementations, the sender may select the file to be shared from the displayed list. The selection can be made, for example, using a touchscreen display, where the sender may select the file 112 by touching an area of the display that shows the file 112. Once the item 112 is selected, the software application may transition to the user interface 120 shown in FIG. 1B. In some implementations, the user interface 120 can show an enlarged representation of the selected file. In some implementations, the user interface 120 provides a graphical representation 122 of the selected file, as in the example shown. In other implementations, the user interface 120 can include additional information indicative of various attributes of the selected file, such as size, encoding format, timestamp, location, or another attribute related to the file.

In some implementations, the user interface 120 can display the identifier 124 of the file and an indicator 126 that the file has been digitally signed. For files that are not digitally signed, the indicator 126 may be absent. In some implementations, the indicator 126 may be replaced with an encoded representation 129 (as illustrated in the user interface 130 shown in FIG. 1C). The encoded representation can include, for example, a Quick Response (QR) code that encodes one or more attributes of the selected document. In some implementations, the encoded representation 129 may be embedded within the document such that the representation 129 appears on the face of the document when the document is printed on paper. A user can scan the representation, using a client device, from the printed document to retrieve additional information about the document on the client device. In some implementations, a document can be initially displayed as the user interface 120 shown in FIG. 1B, and then switched to the user interface 130 after a predetermined time, thereby revealing the encoded representation 129.

In some implementations, the indicator 126 can include a user-selectable control (e.g., a hyperlink) such that selecting the control displays additional information related to the document. For example, selecting the indicator 126 can cause the display of a user interface related to the person responsible for digitally signing the document. FIG. 1D illustrates an example of such a user interface 140 that is used to display a portion of a badge that represents a credential used to electronically sign the document 112. In this example, a portion of the badge that may correspond to the front of a physical badge is displayed in the user interface 140. The user interface 140 can include, for example, an identifier 142 (e.g., a company name) of the credential issuing organization that issued the credential (e.g., the signing user's employer). The user interface 140 can also include the name 144 and a photograph 145 of a user associated with the credential. The user interface 140 can also include information about the credential and/or the associated user and/or the signed document, including, for example, an employee's title 146, a time of signing the document 147, and a place of signing the document 148. The user interface 140 may also include additional information such as an expiration date for the credential, an office number or employee number of the user associated with the credential, and a telephone number of the user associated with the credential.

In some implementations, the user interfaces 120 and 130 can include a control 128 that enables the sender to share the file with another user. Activating the control 128 can cause a presentation of several options by which the file may be shared. For example, if the sender selects the control 128, the software application can transition to displaying the user interface 150 shown in FIG. 1E. The user interface 150 can include, for example, one or more controls 152 and 156 that represent options for sharing the selected electronic file. In some implementations, the options are presented as an overlay on the enlarged representation of the selected electronic file, a portion 151 of which may be visible in the background. The user interface 150 can also include a "Cancel" button 158, for canceling the file sharing.

The sender may share the electronic file by electronic mail (email), by selecting the control 152. Consequently, a copy of the file, or an identifier associated with the file, may be emailed to the recipient. In such cases, the recipient may be able to access the file directly from the e-mail or via an instance of the identity management application executing on the recipient's client device. For example, if the recipient's client device is a smartphone capable of displaying a PDF document, the recipient may be able to access the document directly from the e-mail. In another example, if the recipient's client device is executing an instance of the identity management application, the document may be made available within an inbox within an application.

In some implementations, the recipient's client device may not be suitably equipped to access the document directly from an e-mail or via the identity management application described above. For example, the recipient's client device may be a feature phone that does not have the capability to display a PDF document (or other documents that require installation and execution of a specific software tool), or execute the identity management application. However, such a feature phone may support messaging systems such as SMS or MMS. In such cases, the document, or information about the document, can be made available to the recipient's client device using the messaging based document sharing described herein.

In some implementations, the sender can share the electronic file over a messaging based system using a file access code associated with the electronic file. For example, to share a document, the sender may select the control 156. This can allow the software application to send a request to the server to generate a file access code for the selected electronic file. As part of the request, the software application may send a locally stored credential to the server. The credential can be tied, for example, to a user account at the server. The credential can be used to identify the user to the server, and/or prove to the server, for example based on permissions associated with the linked user account, that the user is authorized to share the particular electronic file for which the file access code is requested.

Upon receiving the request, the server may verify the identity of the user, and/or the authorization of the user to share the electronic file. The server can generate a file access code corresponding to the selected electronic file and send the generated code to the application on the client device of the sender. The sender can then provide the file access code to a recipient, for example, over SMS, MMS, Bluetooth™, Near Field Communication (NFC), e-mail or another appropriate communication method supported by the recipient's client device. In some implementations, the request for sharing the file can also include an identification of the recipient's client device, such that the file access code may also be directly transmitted to the recipient's client device. For example, if the request identifies the recipient's client device as a feature phone and/or provides a phone number associated with the feature phone, the server may (e.g., using an appropriate gateway) send the file access code directly to the recipient's client device over SMS or MMS.

In some implementations, the electronic file may reside on the server prior to the file access code being generated. In some implementations, the electronic file may be locally stored on the client device. In such cases, the sender may be prompted by the server to upload the selected electronic file to the server using the application. The upload may be requested by the server before or after the corresponding file access code is generated. When the file is uploaded to the server, the server can store the file on a storage device accessible by the server and associate the file with the file access code that is generated for the file such that the file access code serves as a reference to the electronic file. In some implementations, the file access code may also be generated at the sender's client device and provided, along with the file, to the server. In such cases, the server associates the file access code with the file and stores both on a storage device accessible to the server.

The file access code received at the sender's client device can be displayed using a user interface such as the user interface 160 shown in FIG. 1F. The sender can then transfer the file access code 162 to an intended recipient of the electronic file. In some implementations, the user interface 160 can include one or more controls 163, 164, and 165 that allow the sender to transfer the file access code 162 to the intended recipient using SMS, MMS, and e-mail, respectively. In some cases, the sender can transfer the file access code verbally to the intended recipient (for example, in person or over the phone). The recipient can then send the file access code over a messaging system (e.g., SMS or MMS) to the server (e.g., via a SMS or MMS gateway, respectively) to request access to the corresponding document or file. This is illustrated by way of an example in FIG. 2A where the file access code is received as an SMS message on a feature phone of the recipient. The SMS message can then be forwarded to an appropriate gateway to request access to the corresponding file.

In some implementations, the software application itself may provide an in-built option to transfer the file access code to the client device of the intended recipient. For example, the user interface 160 can include controls 167 and 168 to allow sharing of the file access code with suitably equipped devices using sound waves (e.g., ultrasonic transmissions) and QR codes, respectively.

In the example shown, if the control 169 is selected, the file access code is an alphanumeric string, which may be a string of alphabetical letters and digits (e.g., a hexadecimal number). In some implementations, the file access code may be a phrase composed entirely of alphabetical letters, or a number, or some other suitable representation. In some implementations, when a document is shared using an alphanumeric file access code, the alphanumeric code may be preceded or followed by an indication of the date on which the code was generated. For example, if the alphanumeric code was generated on Jul. 10, 2013 as A45BK9, it may be represented as JUL1013 A45BK9 or A45BK9 JUL1013. In such cases, when the alphanumeric code is used to attempt to retrieve the document, the indication of the date may not be sent along with the code if the code is sent on the same day the code is generated. In contrast, if the alphanumeric code is being used to attempt to retrieve the document on a day other than the day on which the code was generated, the indication of the date may be sent along with the code. When the server receives a code, and if the code does not include an indication of the date, the server may assume that the relevant date is the current date and search for a document associated with a matching alphanumeric code that was generated on the current date. In contrast, if the code includes the indication of the date, the server looks for a document associated with a matching alphanumeric code that was generated on the date indicated within the code.

In some implementations, once a file access code is generated and linked to a file for sharing, the owner of the file may use the same code to share the electronic file with multiple users. In some implementations, the server may set an expiry time for the file access code when generating the code. The expiry time provides a validity period during which the file access code may be used. If an attempt is made to use the file access code at a time that is after the expiry time of the code, the file access code may not be operable to retrieve the file and the server may send back a notification indicating that the code has expired. In some implementations, a timer 166 may be displayed on the user interface 160 adjacent to the file access code. The timer 166 can indicate the time remaining (in appropriate units) before the file access code 162 expires.

Figure 2B:
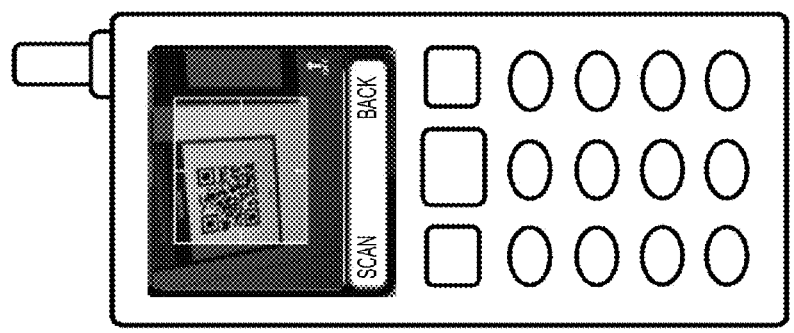
Figure 2A:
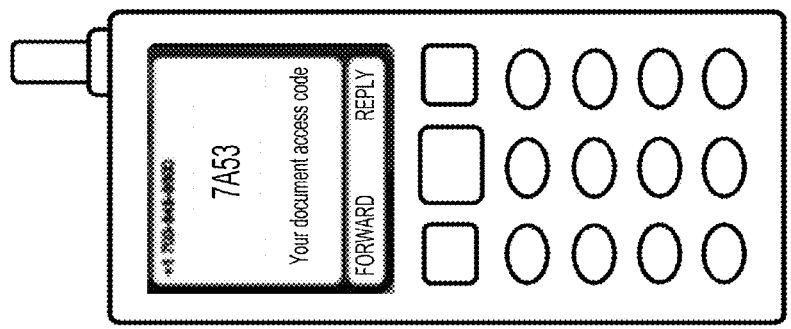

In some implementations, activation of the control 168 can cause a display of a user interface 170 that includes a QR code 172 as illustrated in FIG. 1G. In some implementations, the file access code can be encoded within the QR code 172 such that scanning the QR code by a client device causes the file access code to be decoded and sent to the server as a request to access the document with which the QR code is associated. A recipient can use a client device (e.g., a client device equipped with a camera) to scan the QR code displayed on another client device. In some implementations, activation of a control 173 on the user interface 170 causes a larger display of the QR code 172 (e.g., in a full screen mode) such that the QR code can be easily scanned by a recipient's client device. FIG. 2B shows an example where a QR code is scanned using a camera on a feature phone. In some implementations, the user interface 170 can also include the controls 164 and 165 that allow the QR code to be sent to a recipient's client device (e.g., as an image) over MMS and e-mail, respectively. In some implementations, the QR code received over e-mail or MMS at the recipient's client device can be forwarded to the server (e.g., as shown in FIG. 2C) to request access to the corresponding file or document. While the examples depicted in FIGS. 2A-2C show feature phones being used for requesting access to the files, other mobile devices such as smartphones, personal digital assistants (PDAs), and tablet computers can also be used.

In some implementations, activation of the control 167 can cause a display of a user interface 180 (as shown in FIG. 1H) that includes a graphical icon 182 representing a sound wave based code such as a sonic code. The user interface 180 can also include a control 183 that can cause the code to be transmitted from the client device in the form of a sound wave such as an ultrasonic or audible acoustic signal. A second client device within a vicinity of the transmitting client device can receive the sound waves by sensing the ultrasonic or audible acoustic signal, for example, using a microphone. In some implementations, the code can be provided to a recipient's client device using other short range transmission methods, including, for example, Bluetooth, NFC, infrared communication, or Wi-Fi-based communication.

Upon receiving the request to access the electronic file from the recipient, the server may verify the identity of the recipient, and/or the authorization of the recipient to access the electronic file. The access request can be received, for example, via an SMS or MMS gateway as an SMS or MMS message, respectively. In such cases, the server may be able to determine an identity of the recipient, for example, by retrieving a phone number from the received SMS or MMS message. The authorization of the recipient to access the electronic file can then be verified, for example, by accessing a credential associated with the retrieved identity of the recipient. In some implementations, if an expiry time is associated with the file access code, the server may also determine whether the validity period for the file access code has expired or not. Upon determining that access to the electronic file can be granted, the server looks up the electronic file corresponding to the received code.

Figure 3:
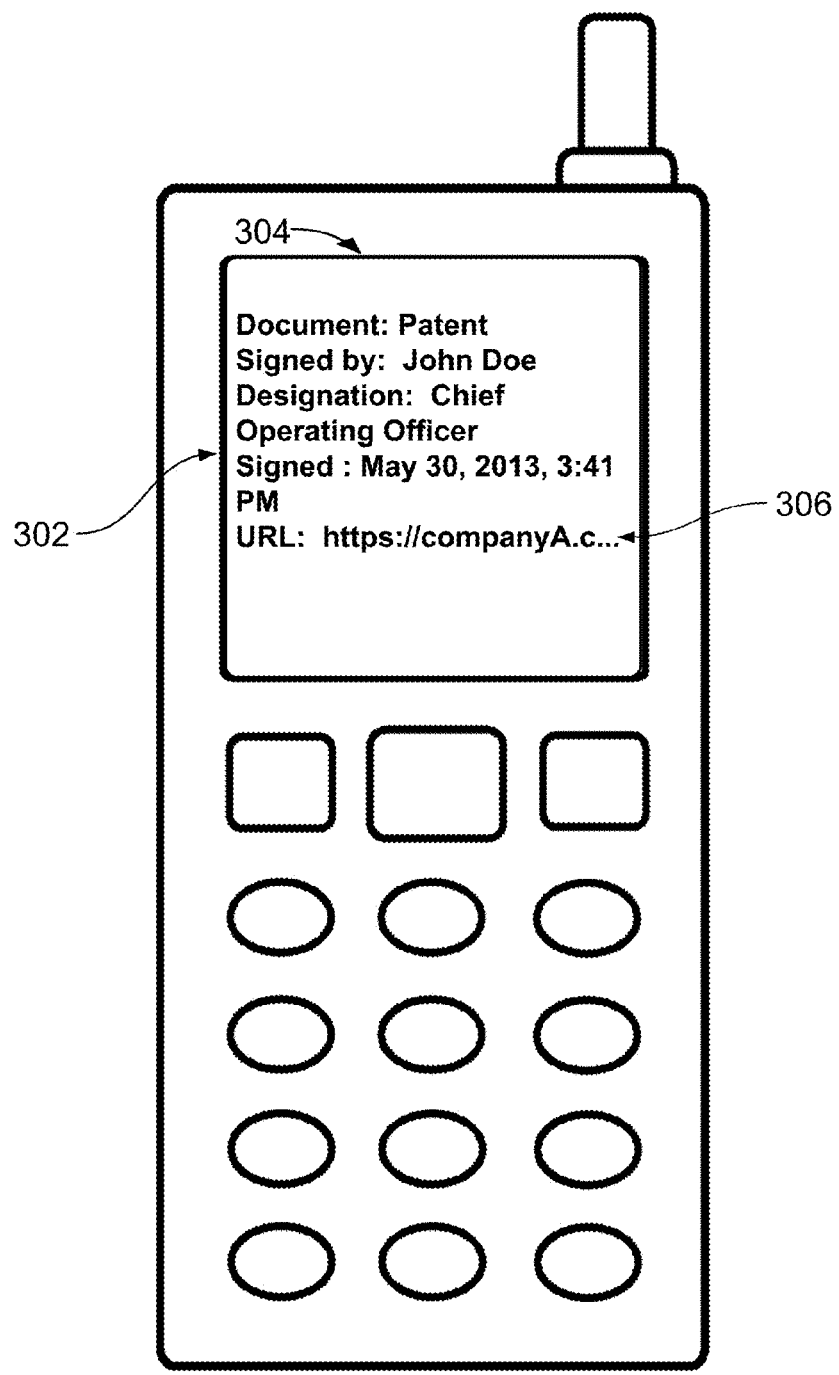
FIG. 3 illustrates an example of a user interface displayed on a client device, the user interface providing information about a document that is shared with the user of the client device.

Based on identifying the electronic file that corresponds to the received code and if all checks are satisfied, the server communicates (or otherwise makes accessible) a message 304 including information about the electronic file. This is illustrated in FIG. 3. In some implementations, the message 304 can include information 302 about the electronic document . . . . The message 304 may be delivered as either an SMS or MMS message to the recipient's client device, based on, for example, the phone number retrieved from the message including the access request. In some implementations, the information 302 may include metadata about the electronic file, e.g., the name and author of the electronic file. Additionally or alternatively, if the electronic file is digitally signed, the information 302 also may include an indication that the file has been digitally signed. In some implementations, when the message 304 is an MMS message, the information 302 can include an image of the document that is viewable on the client device. In some implementations, the information 302 includes a URL 306 for accessing the document using the browser 304. The browser can be a mobile browser available on a mobile device such as a feature phone or a smartphone. For example, an image or text-only version of the document or file can be made available via the URL 306.

Figure 4:
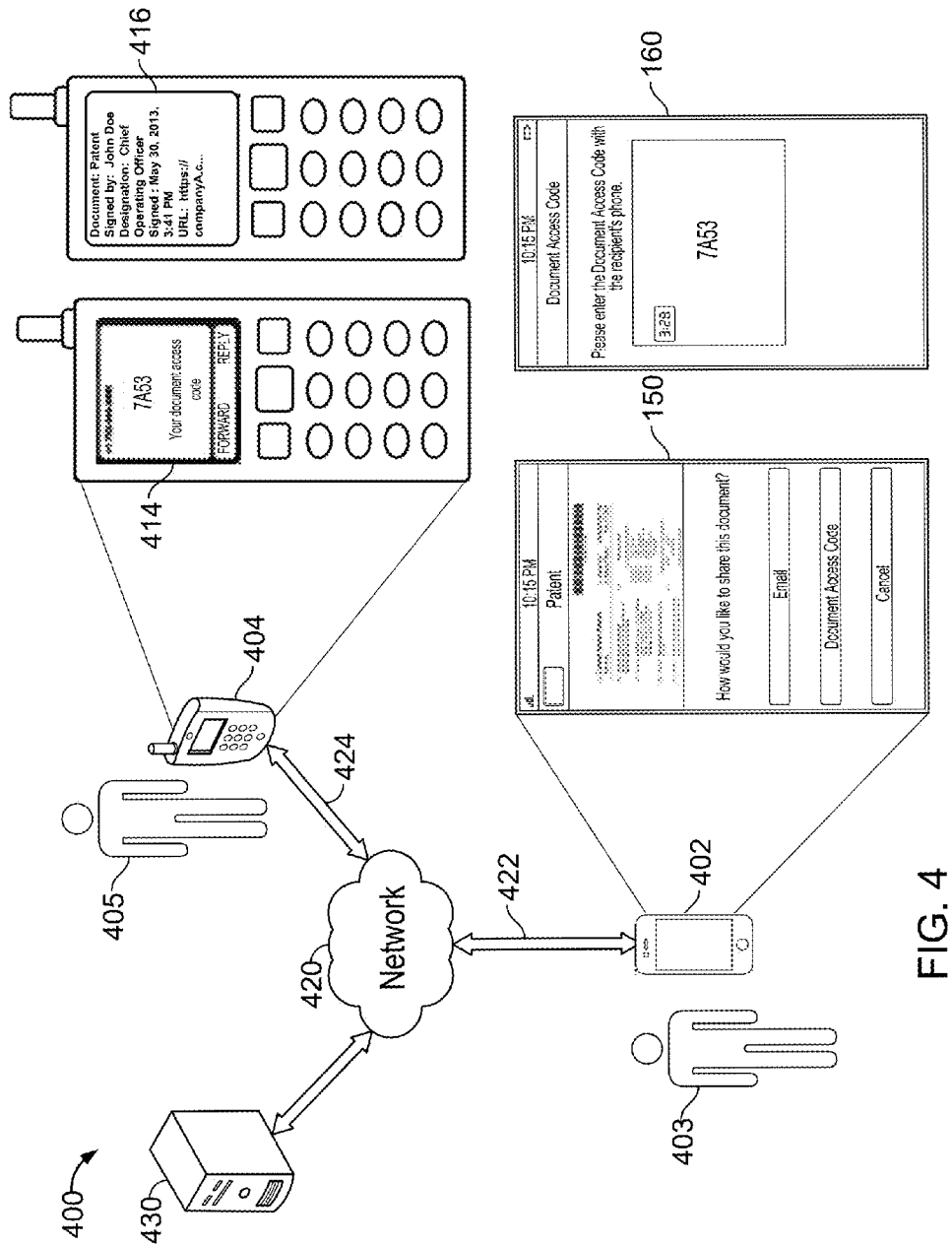
FIG. 4 illustrates an example of a system that facilitates the sharing of information about electronic documents between client devices using a code.

FIG. 4 illustrates an example of a system 400 that facilitates the sharing of electronic files (or information about electronic files) between client devices using file access codes generated by a server. The system 400 can include, for example, client devices 402 and 404 operated by a sender 403 and recipient 405, respectively. Client devices 402 and 404 may communicate with each other and with a server 430 over a network 420, using network connections 422 and 424, respectively. In the example shown in FIG. 4, the user interfaces 150 and 160 are displayed on the sender's client device 402, while the user interfaces 414 and 416 are displayed on the recipient's client device 404. The system 400 can be used to implement the file sharing described above with reference to the FIGS. 1A-1H, FIGS. 2A-2C, and FIG. 3. For example, the user interfaces 110, 120, 130, 140, 150, 160, 170, and 180 can be displayed on a sender's client device 402, and the user interfaces described with reference to FIGS. 2A-2C and FIG. 3 can be displayed on the recipient's client device Each client device 402 or 404 may be, for example, a mobile device such as a cellular phone, a smartphone, a tablet computer, a notebook or laptop computer, an e-book reader or a music player. Alternatively, each client device 402 or 404 may be a desktop computer or any other appropriate portable or stationary computing device. In some implementations, the sender's client device 402 can be a smartphone or another computing device having a capability to execute an instance of the identity management application for managing and sharing electronic files, and the recipient's client device 404 can be a feature phone or another computing device that does not have the capability to execute an instance of the identity management application. Each client device 402 or 404 may include one or more processors configured to execute instructions stored by a computer readable medium for performing various client operations, such as input/output, communication, data processing, software execution and the like. For example, the sender's client device 402 may execute the software application for sharing electronic files that displays the user interfaces 110, 120, 130, 140, 150, 160, 170, and 180 on a display coupled to the client device 402. The displays coupled to the client devices 402 and 404 may be implemented as proximity-sensitive displays (for example, a touch screen) such that each of the sender 403 and receiver 405 may enter information by touching or hovering a control object (for example, a finger or stylus) over the respective display. The software application may be written in any suitable programming language, for example, C, Objective-C, C++, Java, Perl, HTML, etc.

The network 420 may include a circuit-switched data network, a packet-switched data network, or any other network able to carry data, for example, Internet Protocol (IP)-based or asynchronous transfer mode (ATM)-based networks, including wired or wireless networks. The network 420 may include the Internet, Wide Area Networks (WANs), Local Area Networks (LANs), analog or digital wired and wireless networks (for example, IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The network 420 may be configured to handle secure traffic such as secure hypertext transfer protocol traffic (HTTPS) or virtual private networks (VPN). In some implementations, the connections 422 and 424 may be secure connections, such as using VPN or HTTPS. However, in other implementations, the connections may be unsecured connections.

The communications from the client devices may be authenticated. For example, in cases where the client devices 402 and 404 are mobile devices and instances of a mobile application running on the devices are used to communicate with each other and with the server 430, the messages may be signed by the instances of the mobile application to indicate that the messages are generated by the mobile application. In addition, or as an alternative, the messages may be signed by hardware on the client devices 402 and 404, such as using the physical addresses of the respective network interfaces through which the communications are transferred. By signing the messages in such manner, the messages may be authenticated as coming from the client devices 402 or 404, and/or from the mobile application running on the client devices 402 or 404 respectively. In some implementations, the communications between the client devices 402 and 404 may pass through a messaging system gateway device such as an SMS gateway or an MMS gateway. In some implementations, the SMS or MMS gateway can include a computing device that can be configured, for example, to serve as an interface between a client device and the server. For example, the SMS or MMS gateway may be configured to receive an SMS or MMS message from a client device, convert the message to a format that is understood by the server, and forward the converted message to the server. In some implementations, the SMS or MMS gateway may be configured to extract information from a received SMS or MMS message, and communicate the information to the server. For the return path, the SMS or MMS gateway can be configured to receive a message from the server, convert the message to an SMS or MMS message and send the SMS or MMS message to the recipient's client device.

The server 430 may be a single server or it may represent a collection of servers, such as a server farm or another server arrangement. In either implementation, the server 430 includes one or more processors configured to execute instructions stored by a computer-readable medium for performing various server operations, such as executing database applications for managing user accounts and credentials associated with users of client devices, storing electronic files corresponding to the user accounts and running client-server applications for communicating with the software applications on the client devices 402 and 404 for generating file access codes for sharing electronic files between the devices.

In some implementations, the server 430 may function as an identity management system, or be coupled to an identity management system. In such implementations, the server 430 may be configured to validate representations of a credential presented by either user 403 or 405 on his/her respective client device 402 or 404, respectively, by comparing data derived from the user-presented representation with information about the credential that is locally available to the server 430. The server 430 may validate the representations of a credential presented by either user 403 or 405 as a security mechanism to ensure that a user who wishes to share a file as a sender or a user who wishes to access a shared file is authorized to do so.

In this context, a credential may be taken to refer to an evidence of rights or entitlement to privileges that can be, for example, a token that may be used to prove identity to the server or to prove authorization to share or access a file, a badge to gain entrance to a location, an identifier for membership in a group (for example, a graduate of a school or a professional certification), a ticket for entry to an event, a redeemable voucher, a key that unlocks a lock (for example, for entry to a location), and so forth.

Credentials can be represented in various forms, some of which are described below. For example, credentials can be represented by alphanumeric codes including binary, decimal, or hexadecimal numbers, optical machine-readable representations such as bar codes and quick response (QR) codes, sound signals, and/or near-field communication (NFC) signals. Combinations of one or more of these representations can also be used. In certain aspects, credentials also may be time-sensitive. For example, the credentials may be valid only for a predetermined time period such that they cannot be used for validation or any other suitable function either before or after the predetermined time period.

A first form of representation for a credential is an alphanumeric code. As referred to herein, an alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices.

To validate an alphanumeric code, a user or third-party presents the alphanumeric code to a validating device (e.g., a client device operated by a user or a processing system operated by a validating entity). The validating device may validate the alphanumeric code by transmitting a validation request message, which includes the alphanumeric code, to the server. When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server sends the validating device a validation response indicating that the representation for the credential was valid (e.g., the presented alphanumeric code matches a valid alphanumeric code for the credential). In turn, the validating device may then provide an indication that the representation presented by the user or the third-party was valid.

Alternatively or in addition, a validating device may validate an alphanumeric code for a credential locally without requiring interaction with a server. For example, the representation for the credential provided by the third-party may be associated with a certificate associated with the third-party (e.g., a public key infrastructure (PKI) certificate), which may be stored locally at the validating device. The validating device may then compare information decoded from the alphanumeric code with information from the certificate to determine that the alphanumeric code is valid.

Another form of representation for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a QR code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. A validating device can scan the portion of the client device's display showing the representation of the credential and decode the representation of the credential to generate a set of alphanumeric characters that were encoded in the representation of the credential. In particular, the validating device may output a reticle defining a field of view from a camera operatively coupled to the validating device. This reticle can be used to scan the optical machine-readable representation of the credential from the relevant portion of the client device's display.

The validating device may use any suitable mechanism to scan and decode the optical machine-readable representation of the credential. For example, the validating device may access a function or library routine that captures and decodes QR codes and/or barcodes using a camera operatively coupled to the validating device. Suitable libraries may include, for example, RedLaser or Zxing.

In some implementations, the validating device may then validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the representation for the credential was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an optical machine-readable representation locally without requiring interaction with a server. For example, the optical machine-readable representation for the credential may include a certificate associated with the client device of the user or third-party presenting the optical machine-readable representation for validation. Alternatively or in addition, the representation for the credential may be associated with a certificate that is already stored locally at the validating device. The validating device may then compare information decoded from the optical machine-readable representation with information from the certificate to determine that the optical machine-readable representation is valid.

Yet another form of representation for a credential is a sound signal. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including or representing a corresponding credential identifier and any other suitable data. In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The client device can then output the sound signal representation of the credential from a speaker coupled to the client device for reception by a validating device.

To initiate the validation process for a sound signal, a client device outputs a sound signal representing a credential. A validating device may then receive the sound signal at a speaker of the validating device and decode the sound signal representation of the credential to generate a set of alphanumeric characters that were encoded in the sound signal. The validating device may use any suitable mechanism to receive and decode the sound signal.

In some implementations, the validating device may then validate the sound signal by transmitting a validation request message to a server. The validation request message may include data corresponding to the alphanumeric characters that were encoded in the sound signal. When the server receives the validation request message, it attempts to confirm that the presented sound signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the sound signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from a sound signal locally without requiring interaction with a server. For example, the sound signal may include a certificate associated with the client device of the user presenting the sound signal for validation. Alternatively or in addition, the representation for the credential may be associated with a certificate that is already stored locally at the validating device. The validating device may then compare information decoded from the sound signal with information from the certificate to determine that the sound signal is valid.

Still another form of representation for a credential is an NFC signal. NFC as described herein is a set of standards (e.g., ECMA-340 and ISO/IEC 18092) for client devices to establish radio communication with each other by touching them together or bringing them into close proximity (e.g., typically no more than a few centimeters). NFC as described herein may also include other suitable short range wireless communication protocols such as Bluetooth or Zigbee.

A client device may use any suitable technique for encoding a representation of a credential within an NFC signal, such as a function or library routine. An NFC signal representing a credential may encode data including or representing a corresponding credential identifier and any other suitable data. In addition, an NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for an NFC signal, a client device transmits an NFC signal representing a credential. A validating device may then receive the signal at a receiver of the validating device and decode the NFC signal representing the credential to generate the set of alphanumeric characters encoded in the signal.

In some implementations, the validating device may then validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the NFC signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an NFC signal locally without requiring interaction with a server. For example, the NFC signal may include a certificate associated with the client device of the user presenting the NFC signal for validation. Alternatively or in addition, the representation for the credential may be associated with a certificate that is already stored locally at the validating device. The validating device may then compare information decoded from the NFC signal with information from the certificate to determine that the NFC signal is valid.

In operation, the server 430 manages and stores one or more credentials, associates user accounts and shared files with appropriate credentials, and provides representations of the credentials to users' client devices and/or processing systems (for example, operated by credential authorities) for validation. The server 430 can be any suitable computer or collection of computers executing software capable of managing, distributing, and validating representations of credentials for users and shared electronic files via the network 420 as described herein.

Credentials, user accounts and electronic files can be stored in a database (for example, MySQL, PostgreSQL, MS SQL Server, MongoDB), or other suitable data structure that can be accessed by the server 430. In some implementations, the server 430 may access the stored credentials and/or user accounts via web services such as representational state transfer (REST) style services.

In some implementations, the server 430 may present an interface so that users such as users 403 and/or 405 can create user accounts. For example, the server 430 may present an interactive web interface via a web browser that is executed on computing devices associated with the users 403 and 405. The computing devices may be the client devices 402 and 404 or some other suitable machine used by users 403 and 405. Alternatively, applications on the server 430 may be directly accessible via a graphical user interface (GUI) provided by a dedicated software application running on the computing devices, or an application executed on a mobile device, such as the previously-described software application running on client devices 402 or 404.

The user accounts may be stored in a table or collection of tables in a database, or in any other suitable data structure(s) accessible by the server 430. The user accounts may include a variety of information, such as user name, user identifier (for example, a number or character string that uniquely identifies a user), and the address(es) of one or more client devices owned by or otherwise associated with the user.

In some implementations, the user accounts may be created by an entity that is different from the users linked to the user accounts. For example, a company, for example, Company A, may create user accounts for its employees and store the user accounts in the server 430 that is managed by Company A. The entity also may be the credential authority that generates and manages credentials for the user accounts. For example, Company A may generate and manage credentials for the user accounts of its employees; the employees may share electronic files using file access codes that are based on credentials generated by Company A, with the electronic files and linked credentials being managed by the server 430 that is operated by Company A and/or that provides a service to Company A.

In some implementations, the user accounts may include group accounts, which may be a collection of individual user accounts that may perform certain functions using a common credential. Certain individual users may be identified as belonging to a group by linking an entry for the corresponding user account to an entry for the group account, for example by use of a linking table. The group accounts may include a variety of information such as a group name, group identifier (for example, a number or character string that uniquely identifies a group), and a description of the group.

In addition, or as an alternative, to the creation of user accounts and group accounts by entities like a company or some other suitable institution, user accounts and group accounts may be created at the request of potential users through a web-based or other interface, or through any other suitable means such as sending email or SMS to the users. In some implementations, the potential users may be able to create user accounts by use of an application running on a client device, such as the software application running on client devices 402 and/or 404.

Once user accounts have been created, credentials may be generated by the server 430, or the credential authority that is linked to the server 430, for associating with the user accounts, and for use to share electronic files by the users corresponding to the user accounts. For example, in a manner similar to that previously described, the user 403, who wishes to share an electronic file with user 405, may use the software application running on the client device 402 and one or more credentials assigned to the user by the server 430 to request the server 430 to generate a file access code for sharing the desired electronic file. The users may interact with the server 430 through a web interface presented by the server 430 via web browsers running on the client devices, or through the software application providing user interfaces, such as the user interfaces 150 and 160.

Based on the request from the user 403, the server 430 may generate a file access code for the electronic file. In some implementations, the electronic file may already be present in the storage accessible by the server 430 and associated with the user account corresponding to the user 403. In such cases, the server links the generated file access code to the stored electronic file and transmits the file access code to the sender's client device 402 such that the sender 403 may interact with the server 430.

In some implementations, the electronic file may not be present in the storage device coupled to the server 430. In such cases, the user 403 may be prompted to upload the electronic file to the server, for example, through a user interface that is presented on the client device 402. While uploading the electronic file to the server, the user 403 may identify the user account by including, with the upload of the electronic file, one or more credentials that are associated with the corresponding user account.

Once the electronic file is uploaded to the server 430, the server may store the uploaded electronic file in the coupled storage and associate the electronic file with the user account corresponding to the user 403 based on the credentials that are received along with the electronic file. The server can then link the generated file access code to the stored electronic file and transmit the file access code to the client device 402.

The file access code may be presented to the user 403 using, for example, the user interface 160 on the client device 402. Subsequently, once the file access code is shared with the recipient 405, the recipient 405 may attempt to access the shared electronic file by interacting with the server through the client device 404. For example, the user 405 may interact with the server 430 using the software application that is executed on the client device 404. Alternatively, the user 305 can provide the file access code to the server 430 via SMS or MMS messages. In such cases, the client device 404 may interact with the server 430 over an appropriate messaging gateway such as an SMS gateway or an MMS gateway. An SMS gateway can be a computing device in a telecommunications network facility for sending and/or receiving Short Message Service (SMS) transmissions to or from a telecommunications network. In some implementations, SMS gateways may support media conversions between SMS message formats and formats recognized by the server. An MMS gateway can be a computing device in a telecommunications network facility for sending and/or receiving Multimedia Message Service (MMS) transmissions to or from a telecommunications network. An MMS gateway extends SMS capabilities to include multimedia content such as images, video and audio. The SMS or MMS gateways can be accessed, for example using one or more phone numbers. For example, a recipient can provide a received code to the server by sending the code as an SMS (or MMS) message to a designated phone number associated with a corresponding gateway. In some implementations, when the gateway communicates the code to the server, the gateway may also pass on the phone number associated with the recipient's device to the server such that the recipient's phone number can be used to route the information that is sent from the server to the recipient's device.

Once the client device transmits the file access code to the server 430, the server 430 may check whether the file access code is still valid (for example, in cases where the file access codes are time sensitive). If the file access code is determined to be valid, the server 430 can locate the electronic file that is linked to the file access code (for example, by using internally-stored lookup tables that store the association between shared electronic files and corresponding file access codes). If the electronic file is successfully located, the server 430 can provide the electronic file or information about the electronic file to the client device 404. In some implementations, the electronic file or the information about the electronic file can be provided to the client device 404 over SMS or MMS. In some cases, the SMS or MMS message can include an URL that allows the client device 404 to access the electronic file over a browser. In some implementations, the electronic file can be provided to the client device 404, for example, as an image embedded within an MMS message.

In some implementations, the server 430 may not transmit the entire electronic file; instead, the server may send some information related to the electronic file, such as a portion of the electronic file, or some other information (e.g., metadata) associated with the electronic file. This may be the case, for example, when there are restrictions placed on what can be shared. The restrictions may be placed by the user sharing the electronic file, or by the entity that creates and manages the user accounts. The restrictions may be based, for example, on a degree of security that is afforded to sensitive information that may be present in the electronic files. The restrictions may also be based on the capability of the recipient's client device 404. For example, if the recipient's client device is a feature phone that is not capable of displaying a PDF document, metadata information about the document can be provided to the client device instead of the actual document. In some implementations, the restrictions can be based on the messaging protocol used for communications between the client device and the server. For example, if the request for access to the document is transmitted as an SMS message, the requested information can be returned also as an SMS message. In such cases, the information can include only text, such as a limited amount of metadata text about the document. Alternatively, if the request for access to the document is transmitted as an MMS message, the requested information may be returned as an MMS message that includes, for example, an image of the requested document.

In some implementations, the sender 403 may share the electronic file with more than one recipient. For example, the sender may use a common file access code to share the electronic file with multiple recipients. Alternatively, the sender may use different file access codes to share the electronic file with the multiple recipients. In some cases, each recipient may access the electronic file using a file access code that is shared exclusively with the recipient; while in other cases, each recipient may access the electronic file using a file access code that is shared with a subset of the recipients. The restrictions, some of which are indicated above, that are placed on accessing the electronic file may be different for different recipients, based on the file access code that is used by each recipient to access the file.

In some implementations, the file access code may be a one-time use access code. In such implementations, once the user 405 uses the file access code to retrieve the file from the server 430, the server may invalidate the file access code such that the access code cannot be used to retrieve the file any longer. Therefore, any additional request to retrieve the file based on the file access code will be refused by the server 430.

In some implementations, the sender 403 may be able to monitor which recipients have successfully accessed the shared electronic file. For example, when a recipient accesses the shared electronic file, the server 430 may send a confirmation to the software application running on the client device 402; and the software application may present the confirmation to the user 403 using, for example, a suitable user interface. In situations where multiple recipients successfully access the electronic file, the user interface may show information on the multiple recipients who have successfully accessed the electronic file. In some implementations, the server can identify the multiple recipients from phone number information forwarded to the server from an SMS or MMS gateway.

The communications between the client devices 402 and 404 and the server 430 (e.g., communications related to creation of the user accounts, uploading of electronic file, reception of the file access code by the user 403, sharing of the file access code from the user 403 to the user 405, and transmission of the file access code and reception of the shared electronic file by the user 405) may take place over the network connections 422 and 424 that are established over the network 420 connecting the client devices 402, 404 and the server 430.

The system 400 may be used with any file management platform to enable sharing of electronic files using file access codes and other suitable codes. The file management platform may have application programming interfaces (APIs) that can be used by the system 400 to link the file management platform with the credential generation and file sharing functionality provided by the system 400.

Figure 5:
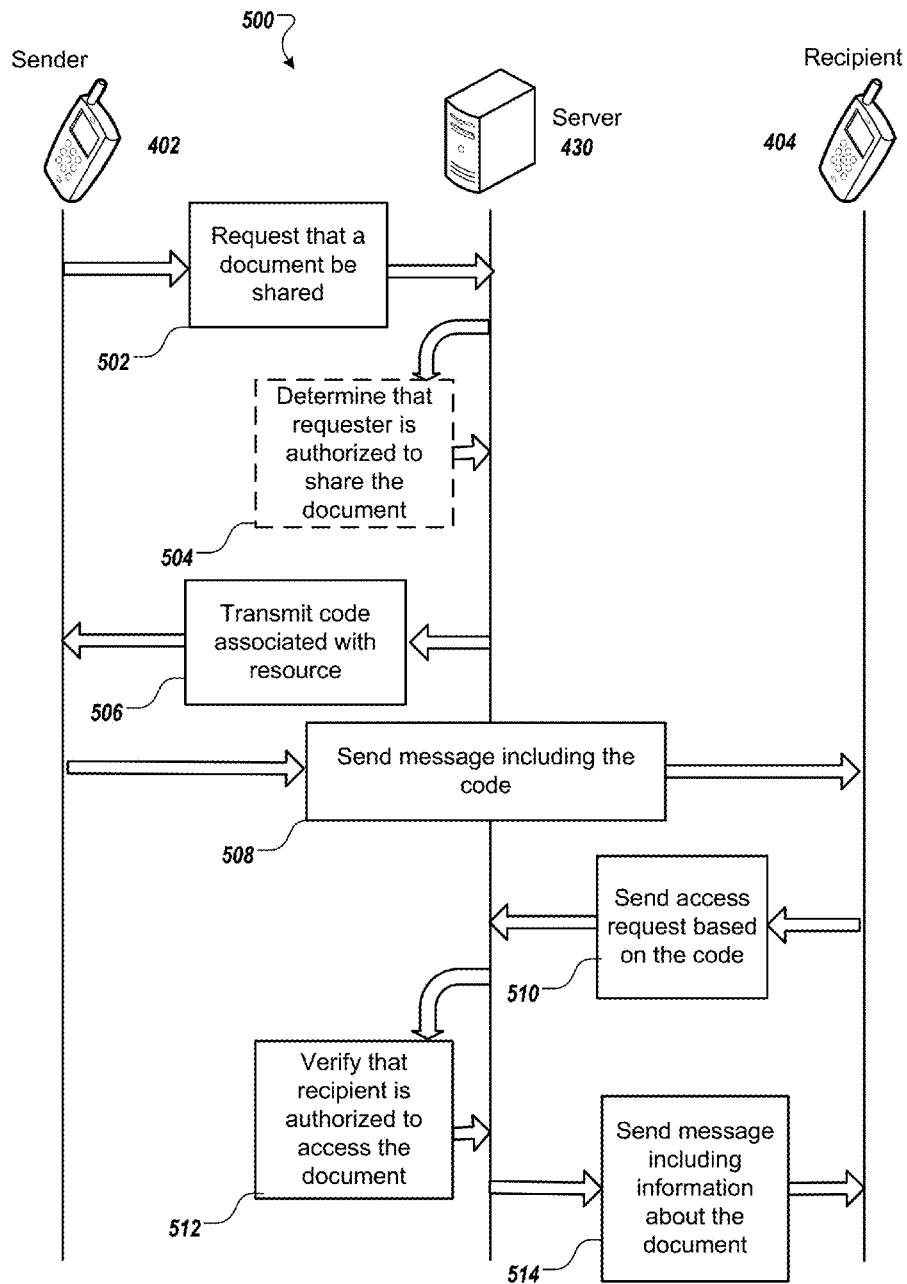
FIG. 5 shows a schematic diagram that illustrates an example of a flow of sample messages between client devices and a server for sharing information about an electronic document between the client devices.

FIG. 5 shows a messaging diagram 500 that illustrates an exemplary flow of sample messages between client devices and a server for sharing an electronic file between the client devices using a file access code generated by the server. For example, the client devices 402, 404 and the server 430 may exchange the sample messages shown in the diagram 500 to share an electronic file between the users 403 and 405 based on file access codes generated by the server 430. The messages described below may be transmitted via any suitable protocol, for example hypertext transfer protocol (HTTP), secure HTTP (HTTPS), e-mail, instant messaging, SMS, MMS, BLUETOOTH™, or NFC.

In the message flow shown by the messaging diagram 500, initially, the client device 402 transmits a request message 502 for a file access code to the server 430. For example, the client device 402 may intend to share an electronic file (e.g., a document) with other users using the credential system managed by the server 430. Therefore, the client device sends the request 502 for a file access code that can be used to share the document.

In response to the request message 502, the server 430 may perform a determination 504 if the sender is authorized to share the document. This can be done, for example, by checking the credentials associated with the sender and/or the sender's client device 402. The server then transmits a response message 506 to the client device 402 wherein the response 506 includes a file access code, e.g., responsive to having determined that the sender is authorized to share the document. In some implementations, when the request message 502 identifies an intended recipient (e.g., by a corresponding phone number associated with the recipient's client device), the server 430 may also transmit the message 506 to the recipient's client device 404 directly.

The sender can then share the file access code with the recipient. This can be done, for example, by sending a message 508 from the sender's client device 402 to the recipient's client device 404. The message 508 includes the file access code, and can be sent, for example, as an e-mail, SMS or MMS. In some implementations, the message 508 may be sent using another transmission mechanism, such as Near Field Communication (NFC), ultrasonic transmission, BLUETOOTH™, or a Wi-Fi based communication. In implementations where the file access code is a QR code, the recipient may scan the QR code displayed on the sender's client device 402 using, for example, a camera on the recipient's client device 404. In some cases, the sender can verbally communicate (e.g., in-person or over phone) the file access code to the recipient, e.g., when the file access code is an alphanumeric code.

Upon receiving file access code, the recipient can send an access request 510 from the recipient's client device 404 to access the document. The access request 510 identifies or includes the file access code. In some implementations, the access request 510 can include an identification of the recipient's client device 404 and/or an identification of a user account/credential associated with the recipient. The access request 510 can be transmitted to the server 430 over an SMS or MMS. In some implementations, the access request 510 can be routed through the server 430 via an SMS/MMS gateway. The access request 510 can be sent to the gateway from the client device 404, using, for example, a dedicated phone number associated with the gateway. In some implementations, the gateway can be configured to detect whether the access request 510 is received as an SMS or MMS, such that the request is processed accordingly. The gateway may communicate information to the server accordingly. In some implementations, the information that eventually gets returned to the client device 404 can depend on whether the access request 510 is received over SMS or MMS. For example, if the access request 510 is received over SMS, the information eventually returned to the client device 404 can be via an SMS message that includes text-based metadata about the document. Alternatively, if the access request 510 is received over MMS, the information eventually returned to the client device 404 can be via an MMS message that includes an image of the document. In some implementations, the gateway can be configured to determine the phone number of the client device 404 based on the access request 510, for example, to route a response to the client device 404.

Upon receiving the access request 510, the server 430 may perform a verification 512 that the recipient is authorized to access the document being requested using the file access code. This can include identifying the document that is linked with the file access code, and checking the credentials associated with the recipient. The server may be able to identify a recipient based on, for example, phone number information extracted from the access request 510, and forwarded by the gateway. The server 430 may also check whether the file access code is valid, for example, whether the time period for which the file access code may be used has expired. In some implementations, the verification 512 may entail requesting secondary authentication information from the recipient. For example, the recipient may be asked to prove that he/she is in possession of a physical copy of the document before access to the corresponding electronic version is provided. In such cases, the recipient may be asked to include a portion of the document (e.g., the first three words of the second paragraph) as the secondary authentication information. Access to the electronic version of the document may be provided only if the portion of the document provided as the secondary authentication matches the corresponding portion in the electronic version of the document.

Based upon the verification 512, the server can send a message 514 to the recipient's client device 404. The message can be sent, for example, over an SMS or MMS. In some implementations, the message can include information on the document. For example, the message 514 can include metadata information about the document, e.g., the name and author of the document, an indication that the file has been digitally signed, and an identification of the person who has signed the document. In some implementations, the message 514 can include an image of the document that is viewable on the client device, for example, using a browser or MMS interface. In some implementations, the message 514 can include a URL for accessing the document using a browser. For example, an image or text-only version of the document or file can be made available via the URL. In some implementations, the URL provided in the message 514 can be used to access the document within a predetermined or pre-specified time limit. The message 514 can also include a password that the recipient may need to enter when accessing the document (or information about the document) using the URL.

In some implementations, the content of the message 514 can be determined based on, for example, whether SMS or MMS is used for sending the access request 510. For example, if the access request 510 is received over SMS, the message 514 can be an SMS message that includes text-based metadata about the document. Alternatively, if the access request 510 is received over MMS, the message 514 can be an MMS message including, for example, an image of the document.

Figure 6:
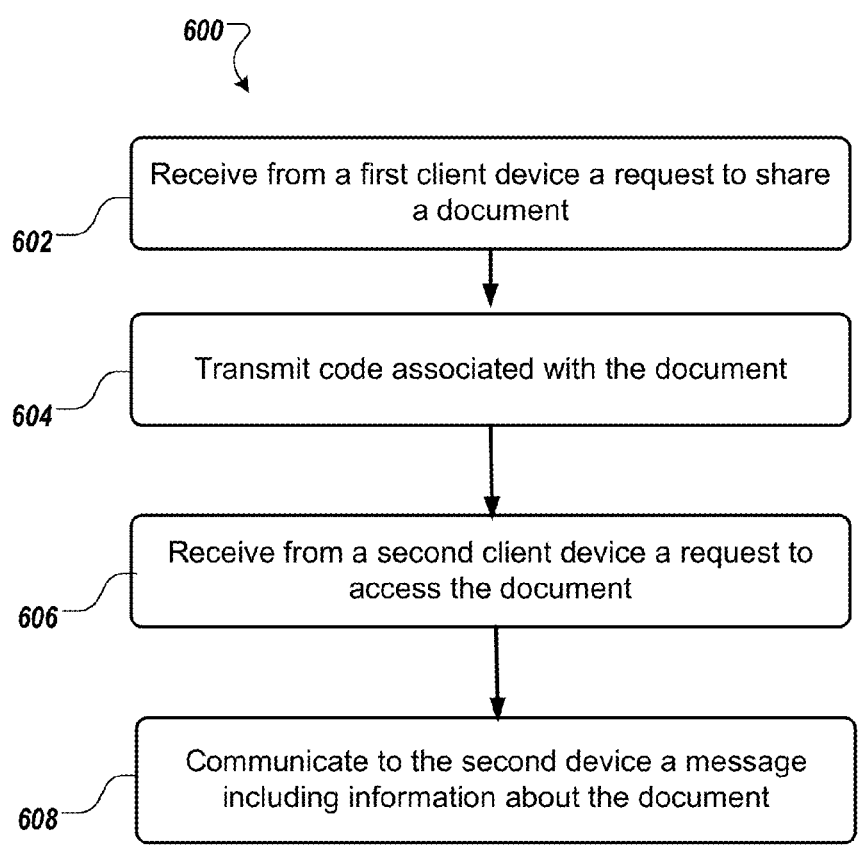
FIG. 6 illustrates an example of a process that can be used to share information about an electronic document between client devices.

FIG. 6 illustrates an example of a process that can be used to share an electronic document between client devices. For example, the process 600 may be executed by the server 430 to allow sharing of an electronic file (e.g., a document) between a sender's client device 402 and a recipient's client device 404. Operations associated with the process can include receiving from a first client device a request to share a document (602). The request can include an identification of the sender's client device (e.g., a phone number associated with the first client device) and/or a user account of the sender within a credential authority accessible by the server. The request can be sent using an identity management application executing on the sender's client device. The document can include a certification (e.g., a digital signature of the first user), and the certification can be based on metadata associated with the document. For example, the certification can include a time-stamp indicating a time the document was signed.

Operations also include transmitting a code (e.g., a file access code) associated with the document (604). This can include generating the code for the document upon verifying that the sender is authorized to share the document. The code can include, for example, an alphanumeric code, a QR code, a sound signal based code, and/or an NFC signal based code. The server can store the generated code such that the code is uniquely linked to the document for which the code is generated. The code can be transmitted to the sender's client device, or to the recipient's client device if the recipient's client device is identified in the request for the code. In some implementations, the code transmitted to the sender's client device can be a reference code (e.g., an alphanumeric code) generated at the server, and the sender's client device then encodes the reference code as a QR code or sound signal for providing to the recipient. The code can be transmitted to the sender's client device or the recipient's client device using, for example, an SMS, an MMS.

Operations also include receiving from a second client device (e.g., the recipient's client device), a request to access the document (606). The request to access the document can be received from the second client device, for example, via a messaging gateway such as an SMS gateway or an MMS gateway. The request to access the document may identify the second client device and/or a user account/credential associated with the recipient. For example, the request to access the document can be sent via an SMS message that identifies the recipient's client device by a phone number. The server, upon receiving the phone number may retrieve a user account associated with the phone number, for example, to determine whether the user account is authorized to access the document. The request to access the document can also include secondary authentication information. For example, in some cases, the recipient may be asked to prove that he/she is in possession of a physical copy of the document, before access to the electronic version of the document is provided. In such cases, the recipient may be asked to include a portion of the document (e.g., the first three words of the second paragraph) as the secondary authentication information. Access to the electronic version of the document may be provided only if the portion of the document provided as the secondary authentication matches the corresponding portion in the electronic version of the document.

Operations also include communicating to the second device a message that includes information about the document (608). In some implementations, the message can be communicated upon verifying that the recipient is authorized to access the requested document. If a determination is made that the recipient is not authorized to access the document, or if the file access code is determined to have expired, the message can include a notification that access to the document is being denied, and optionally a reason for the denial. The message can be communicated, for example, over an SMS or MMS. In some implementations, the information on the document can include, for example, metadata information about the document (e.g., the name and author of the document, an indication that the file has been digitally signed, and an identification of the person who has signed the document). In some implementations, the information on the document can include an image of the document that is viewable on the client device. In some implementations, the information on the document can include a URL for accessing the document using a browser. In some implementations, the information on the document can be determined based on, for example, whether SMS or MMS is used for sending the corresponding access request. For example, if the access request is sent over SMS, the information on the document can be sent as an SMS message that includes text-based metadata about the document. Alternatively, if the access request is sent over MMS, the information on the document can include an MMS message that includes an image of the document.

A wide variety of applications is possible based on the subject matter described above. For example, a recipient may be allowed to use a client device to view information (e.g., metadata) about a document that has been shared with the recipient, for example, via a web-based application, even if the recipient's client device (e.g., a feature phone) is not capable of executing or otherwise interacting with the web-based application itself. The file access code may be used to provide a layer of security in sharing electronic files, in addition or as an alternative to the intended recipient having to authenticate him/herself using credentials. The sharing of electronic files may be limited to within certain groups of users, such as employees of a company. The sender may share an electronic file simultaneously with multiple recipients in an efficient manner, and receive confirmation indicating which recipients have successfully received the shared electronic file. The sender may limit the sharing of electronic files to predetermined time periods, such that the recipients may not be able to access sensitive information at other times.

The features described can be implemented in digital electronic circuitry, in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving, by a server system from a first client device associated with a first user, a request for sharing a document with a second client device, wherein the document is electronically signed using a credential of the first user, and the credential identifies one or more privileges allocated to the first user;
   in response to receiving the request for sharing the document with the second client device, generating, by the server system, a code that allows access to the document;
   transmitting, from the server system to the first client device, the code that allows access to the document;
   receiving, by the server system from the second client device, a request to access the document, the request to access the document including the code that allows access to the document;
   based on the request to access the document, determining, by the server system, that a second user associated with the second client device is authorized to access the document; and
   communicating, by the server system to the second client device, a message including information about the document based on determining that the second user associated with the second client device is authorized to access the document.

2. The computer-implemented method of claim 1, wherein the document comprises a certification that (i) is based on metadata associated with the document, and (ii) comprises a digital signature of the first user.

3. The computer-implemented method of claim 1, wherein:
   the code is transmitted to the second client device using one of a short messaging service (SMS) protocol, a multimedia messaging service (MMS) protocol, or an e-mail; and
   the request to access the document is received from the second client device via a short messaging service (SMS) gateway or a multimedia messaging service (MMS) gateway.

4. The computer-implemented method of claim 1, wherein:
   the request for sharing the document comprises an identification of the second client device;
   the request to access the document comprises a portion of the document and the identification of the second client device; and
   determining, by the server system, that the second user associated with the second client device is authorized to access the document comprises:
   obtaining the document from a storage device; and
   prior to communicating the message including information about the document to the second client device, determining that the portion of the document from the request to access the document matches a corresponding portion of the document obtained from the storage device.

5. The computer-implemented method of claim 1, wherein the code that allows access to the document comprises one or more of a graphical representation of the code, an optical machine-readable representation of the code, a sound-wave-based code, a numeric code, an alphanumeric code, and a uniform resource locator (URL).

6. The computer-implemented method of claim 1, wherein:
   the message comprises one or more of (i) metadata information associated with the document, (ii) a uniform resource locator (URL) for accessing the document, and (iii) an image of the document; and
   the message is communicated via a short messaging service (SMS) gateway or a multimedia messaging service (MMS) gateway.

7. The computer-implemented method of claim 1, wherein determining, by the server system, that the second user associated with the second client device is authorized to access the document comprises:
   verifying that the second client device is associated with the second user; and
   verifying that the second user is authorized to access the document.

8. The computer-implemented method of claim 1, wherein generating, by the server system, the code that allows access to the document comprises:
   determining whether the first user is authorized to share the document with the second client device by verifying the credential of the first user; and
   in response to determining that the first user is authorized to share the document with the second client device, generating the code that allows access to the document.

9. The computer-implemented method of claim 1, wherein determining, by the server system, that the second user associated with the second client device is authorized to access the document comprises:
  determining whether a time period for utilizing the code that allows access to the document is not expired; and
  determining that the second user associated with the second client device is authorized to access the document in response to determining that the time period for utilizing the code that allows access to the document is not expired.

10. The computer-implemented method of claim 1, wherein determining, by the server system, that the second user associated with the second client device is authorized to access the document comprises:
  determining that the second user associated with the second client device is in possession of a physical copy of the document.

11. A system comprising:
  one or more computing devices and one or more storage devices storing instructions that, when executed by the one or more computing devices, cause the one or more computing devices to perform operations comprising:
    receiving, from a first client device associated with a first user, a request for sharing a document with a second client device, wherein the document is electronically signed using a credential of the first user, and the credential identifies one or more privileges allocated to the first user;
    in response to receiving the request for sharing the document with the second client device, generating a code that allows access to the document;
    transmitting, to the first client device, the code that allows access to the document;
    receiving, from the second client device, a request to access the document, the request to access the document including the code that allows access to the document;
    based on the request to access the document, determining that a second user associated with the second client device is authorized to access the document; and
    communicating, to the second client device, a message including information about the document based on determining that the second user associated with the second client device is authorized to access the document.

12. The system of claim 11, wherein the document comprises a certification that (i) is based on metadata associated with the document, and (ii) comprises a digital signature of the first user.

13. The system of claim 11, wherein:
  the code is transmitted to the second client device using one of a short messaging service (SMS) protocol, a multimedia messaging service (MMS) protocol, or an e-mail; and
  the request to access the document is received from the second client device via a short messaging service (SMS) gateway or a multimedia messaging service (MMS) gateway.

14. The system of claim 11, wherein:
  the request for sharing the document comprises an identification of the second client device;
  the request to access the document comprises a portion of the document and the identification of the second client device; and
  determining that the second user associated with the second client device is authorized to access the document comprises:
    obtaining the document from a storage device; and
    prior to communicating the message including information about the document to the second client device, determining that the portion of the document from the request to access the document matches a corresponding portion of the document obtained from the storage device.

15. The system of claim 11, wherein the code that allows access to the document comprises one or more of a graphical representation of the code, an optical machine-readable representation of the code, a sound-wave-based code, a numeric code, an alphanumeric code, and a uniform resource locator (URL).

16. The system of claim 11, wherein:
  the message comprises one or more of (i) metadata information associated with the document, (ii) a uniform resource locator (URL) for accessing the document, and (iii) an image of the document; and
  the message is communicated via a short messaging service (SMS) gateway or a multimedia messaging service (MMS) gateway.

17. The system of claim 11, wherein determining that the second user associated with the second client device is authorized to access the document comprises:
  verifying that the second client device is associated with the second user; and
  verifying that the second user is authorized to access the document.

18. The system of claim 11, wherein generating the code that allows access to the document comprises:
  determining whether the first user is authorized to share the document with the second client device by verifying the credential of the first user; and
  in response to determining that the first user is authorized to share the document with the second client device, generating the code that allows access to the document.

19. The system of claim 11, wherein determining that the second user associated with the second client device is authorized to access the document comprises:
  determining whether a time period for utilizing the code that allows access to the document is not expired; and
  determining that the second user associated with the second client device is authorized to access the document in response to determining that the time period for utilizing the code that allows access to the document is not expired.

20. The system of claim 11, wherein determining that the second user associated with the second client device is authorized to access the document comprises:
  determining that the second user associated with the second client device is in possession of a physical copy of the document.

* * * * *